United States Patent Office 3,440,044
Patented Apr. 22, 1969

3,440,044
ANTHROIC ACIDS AND METAL ANTHROATE SALTS USED AS PHOTOCONDUCTORS IN ELECTROPHOTOGRAPHIC IMAGING METHODS
Louis A. Du Plessis, Midland, Mich., assignor to The Dow Chemical Company, Midland, Mich., a corporation of Delaware
No Drawing. Filed July 19, 1965, Ser. No. 473,176
Int. Cl. G03g 5/08, 13/04
U.S. Cl. 96—1                                9 Claims

ABSTRACT OF THE DISCLOSURE

New anthroic acids, particularly the 1-, 2-, or 9-acids, are useful as photoconductive materials. Similarly useful are selected metal salts of anthroic acid: when the metal is cadmium or mercury the carboxylate group is in the 2 or the 9 position, when the metal is lead, chromium, titanium or tin the carboxylate group is in the 9 position, and when the metal is zinc the carboxylate group is in the 1, 2 or 9 position. A new electrophotographic recording element comprises a substrate having on the surface thereof an electrophotosensitive layer containing the described photoconductive material. Such electrophotographic recording element is used in a method of electrophotographically reproducing an image.

---

This invention relates to electrophotography and more particularly relates to a new and novel organic composition having particular utility as a photoconductor, to a method of preparing said photoconductive composition, and to an improvement in a method of electrophotographically reproducing an original image with said photoconductor.

A primary object of the present invention is to provide a new and novel organic composition of matter, having particular utility as a photoconductor in electrophotosensitive layers used in electrophotographic printing.

Another object of the invention is to provide a new and novel photoconductor composition for use in the electrophotographic reproduction of an image.

A further object is to provide a method of preparing these novel compositions.

Still another object of the invention, in an electrophotographic method of preparing copies of an original image wherein a photosensitive layer is electrostatically charged, exposed to an illuminated image, then contacted with an electroscopic marking or other material, is to provide an improvement therein employing a novel organic photoconductor composition in the photosensitive layer.

The novel composition of the present invention is a crystalline metal anthroate salt corresponding to the following general formula:

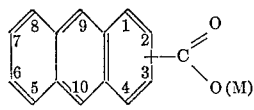

wherein M is a metal selected from the group consisting of zinc, cadmium, mercury, titanium, chromium, lead and tin (Sn++), said metal anthroate being further characterized in that when M is cadmium or mercury the carboxylate group is in the 2 or 9 position, and that when M is lead, chromium, titanium, or tin, the carboxylate group is in the 9 position and that when M is zinc the carboxylate group is in the 1, 2 or 9 position. These salts have particular utility as photoconductors in electrophotosensitive compositions for use in printing.

Of these novel compounds the vitreous forms of the zinc 9-anthroate, the zinc 1-anthroate, and the mercury 9-anthroate are particularly useful as photoconductors in electrophotographic printing in that they are transparent. The vitreous forms may be obtained by deposition from a solvent, as will be described more fully hereinafter.

In addition to the novel metal anthroate salt compositions disclosed directly hereinbefore, the anthroic acids and particularly the 1-, 2- or 9-anthroic acids also have been found for the first time to be suitable for use as photoconductors for use in electrophotographic printing. These latter materials can be obtained commercially in technical grades which are suitable for use in the present invention. They may also be prepared by the various methods disclosed in the literature, for example, by the literature method cited in Example X appearing hereinafter.

The novel metal anthroate salts are prepared in accordance with the present invention by (a) admixing a preselected 1-, 2- or 9-anthroic acid with a strong base such as sodium or potassium hydroxide, to produce a solution of soluble alkali metal anthroic salt, (b) reacting the resulting solution with an inorganic salt, said salt having a metal cation selected from the group of those listed hereinbefore, and (c) separating the crystalline anthroate metal salt so-produced such as by filtration. Thereafter, the salt may be washed with water and dried. Normally the acid step (a) is admixed with the strong base in an aqueous medium. With respect to 1-anthroic acid, however, a liquid medium of approximately one part water to 2 parts ethanol is preferably employed for the admixing medium.

The temperatures which may be used in the preparation of the present novel metal anthroate salts are not critical, the maximum temperature being limited only by the boiling point of the reaction mixture and the minimum temperature limit by the freezing point thereof. Ordinary room temperatures (25° to 30° C.) are quite suitable and are preferred for preparing these photoconductive salts. Similarly, the proportions and concentrations of the reactants are not critical. Also, there is no advantage in using other than atmospheric pressures in the preparation, although such are operable.

The novel vitreous forms of the zinc 9-anthroate, zinc 1-anthroate and the mercury 9-anthroate, as preferred photoconductors in electrophotographic printing, may be obtained by the novel method of first dissolving the corresponding crystalline anthroate salt, obtained as described above, in one or more solvents or solvent mixtures selected from the four following classes of solvent materials:

(1) Aldehydes, ketones, esters, acid amides, and acid anhydrides
(2) Solutions of relatively non-volatile liquid aldehydes, ketones, esters, acid amides, and acid anhydrides in relatively volatile aldehydes, ketones, esters, acid amides, and acid anhydrides
(3) Solutions of normally crystalline aldehydes, ketones, esters, acid amides, and acid anhydrides in liquid aldehydes, ketones, esters, acid amides and acid anhydrides
(4) Solutions of polymers in aldehydes, ketones, esters, acid amides and anhydrides.

The resulting solution of anthroate salts in the solvent is applied as a layer on a substrate of, for example, conductive glass, or other suitable material, and the solvent removed therefrom as by drying to produce a solid residue of the salt as a deposited vitreous surface layer. Preferably the drying, i.e., solvent removal is carried out at room temperature. Forced drying at elevated temperature may be carried out depending on the solvent material used; however, in some cases these higher temperatures tend to convert the vitreous form of the salt back to the crystalline form or even bring about decomposition of the salt. Of the solvents specified, methyl ethyl ketone and acetone are preferred, primarily for their fast drying properties.

The concentration of solvents from which the vitreous layer is deposited is only important insofar as it controls the thickness of the layer. For example, a very thin layer will produce no image while a very thick layer tends to crack. Preferably a layer thickness as deposited and dried of from about 2 to 4 microns is desired, while thicknesses of from about 0.5 to 50 microns are normally operable.

In employing the aforesaid metal anthroate salts and/or the anthroic acids of the present invention as photoconductors contained in electrophotosensitive coatings or layers, the photoconductor is applied to a suitable substrate or plate either by deposition from the solvent as described, or mechanically as an adherent mixture with, for example, suitable resinous matrix binders such as various silicone intermediate resins. The coated plate, also referred to as a recording element, is then electrostatically charged positively or negatively depending on the photoconductor, exposed to an illuminated image, and contacted with an image developing material, such as, for example, a low melting, resinous, electroscopic, particulate marking substance, when the substrate is a paper sheet, to form a visible powder image, or, a cross-linking catalyst when the photoconductor is dispersed in a resin to form an acid etch resist on metal. The excess marking material, i.e., that not adhering to the charged image areas, is removed and the plate is heated for a short time at an elevated temperature to fuse the marking resin and bond it to the plate thus "fixing" the visible image thereon. This process may be repeated and automated using successive substrate elements to make a number of copies. In addition, employing conventional xerographic methods, the powder image may be lifted off the plate and transferred to a separate paper substrate and thereupon heated to fix the powder image on it.

The term "image developing material" as used herein means an electroscopic particulate substance, which when contacted with the present novel photoconductor-containing layers are either (a) capable of providing a visible, fusible, powder image corresponding to a latent electrostatic image to which it may be attracted, or (b) as in the case where said photoconductors may be dispersed in a cross-linking resinous binder to form a photoconductive or photosensitive composition and layer on a metal substrate, capable of cross-linking said resin upon heating to form an acid etch resist image thereon, such as, e.g., a cross-linking promoting catalyst of, e.g., aluminum octanoate.

The term "metal anthroate salt" as used herein means the photoconductive anthroate salts described and claimed herein whether crystalline or vitreous in form.

Among the advantages of the invention are that the vitreous layers of photoconductive material are substantially transparent so that they can be used on a glass substrate for diascopic projection. In addition, the anthroate layers retain their electrophotographic properties even after being heated to, for example, 260° C. Also, the layers of the present photoconductive materials are readily and easily obtained, whereas the conventional selenium xerographic layers must be produced by vacuum deposition.

The following examples serve to illustrate the present invention but are not intended to be construed as limiting it in any way.

EXAMPLE I

A solution of 10.0 g. sodium hydroxide in 250 ml. water was kept hot, at about 80° C., while 9-anthroic acid was added until no more dissolved. The resulting solution was filtered and with washings had a volume of 460 ml. An 80 ml. portion was added to a solution of 7.6 g. zinc chloride in about 30 ml. water. The resulting crystalline precipitate of zinc 9-anthroate was filtered off, washed 5 times with water, and dried at room temperature.

0.13 g. of the dry material was dissolved in 3 ml. methyl ethyl ketone, the solution was filtered, and the filtrate spread on a magnesium photoengraving grade metal plate (2" x 4" x 0.064") and on a plate of electrically conducting glass (Pyrex glass coated with tin oxide). Spreading was done with a glass rod, which was pressed down on 2-ply Scotch tape spacers placed along the edges of the plates. The methyl ethyl ketone was allowed to evaporate, and vitreous layers about 2 microns thick remained on the plates. These vitreous layers were stored in the dark overnight.

Both the metal and glass plate samples were laid on a grounded metal plate in a darkroom, with the anthroate layers upward, and the conducting layer of the glass was connected to the grounded plate. A positive corona at 7000 volts was used to charge the anthroate layers. A latent electrostatic image of a photographic transparency was produced on the layers by a 12 sec. exposure to a 12 footcandle intensity tungsten lamp. The image was developed by means of Xerox (trademark) type 10 toner, applied with a magnetic iron-filing brush. The images so-produced were of acceptable quality.

EXAMPLE II 9-anthroic acid was added to a solution of 2.20 g. of potassium hydroxide at about 80° C. in 200 ml. water until no more dissolved. The resulting solution was filtered into 5.26 g. of a 51% aqueous solution of zinc chloride. The two solutions were mixed well to obtain a precipitate of zinc 9-anthroate, which was filtered off, washed 5 times with water, and dried at room temperature.

A portion of this zinc 9-anthroate was dissolved in acetone. The solution was centrifuged to remove a small insoluble residue and spread on a magnesium photoengraving grade metal plate by means of a screw-threaded steel rod. The resulting layer of liquid was allowed to lose acetone by evaporation, thereby depositing a vitreous layer of about 2 to 4 microns in thickness.

The plate was stored in the dark overnight, and an electrophotographic image was made essentially by the method described in Example I. The reproduced image was acceptable for use.

EXAMPLE III

A solution of 0.077 g. of zinc 9-anthroate (prepared as described in Example II) in 3.6 ml. isopentyl acetate was centrifuged to remove a slight insoluble residue and used to make a vitreous layer about 2 to 4 microns thick on a magnesium photoengraving grade metal plate by the method described in Example II. An electrophotographic image was produced thereon essentially by the method described in Example I. The image so reproduced was acceptable for use.

EXAMPLE IV

A solution of 0.0850 g. of zinc 9-anthroate (prepared as described in Example II) and 0.1293 g. of benzaldehyde in 2.5 ml. of acetone was centrifuged to remove a small insoluble residue. The anthroate-acetone solution was then spread on a magnesium metal plate by means of a screw-threaded steel rod. The resulting layer of liquid was allowed to lose acetone by evaporation at room temperature, and the plate was then heated in a ventilated oven at 113–115° C. for about 21 minutes. The vitreous layer thus produced was about 2 to 4 microns thick and was used for preparing an electrophotographic visible image by the method of Example I, except that the time of exposure to light was 6 sec. Again, the image so reproduced was acceptable for use.

EXAMPLE V

The procedure of Example IV was repeated with a solution of 0.0922 g. of zinc 9-anthroate and 0.1422 g. of salicylaldehyde in 2.4 ml. of acetone, except that heating took place for 13 minutes at 113–119° C. A vitreous layer of from 2 to 4 microns in thickness was prepared and used to produce a visible image. The image so-produced was acceptable for use.

EXAMPLE VI

The procedure of Example IV was repeated with a solution of 0.0918 g. of zinc 9-anthroate and 0.0293 g. of 9-anthraldehyde in 2.5 ml. acetone, except that heating was omitted. The image produced in this example was also quite satisfactory for use.

EXAMPLE VII

The procedure of Example IV was repeated with a solution of 0.0921 g. of zinc 9-anthroate and 0.1577 g. of formamide in 2.5 ml. of acetone, except that heating took place for 50 minutes at 116–120° C. Again, an acceptable image was produced.

EXAMPLE VIII

The procedure of Example IV was repeated with a solution of 0.0841 g. of zinc 9-anthroate and 0.2040 g. of acetic anhydride in 2.6 ml. of acetone, except that heating took place for 41 minutes at 105–110° C. As in Examples IV through VII, an acceptable image was produced.

EXAMPLE IX

A solution of 10.0 g. of sodium hydroxide in 250 ml. water was kept hot at about 80° C., while 9-anthroic acid was added until no more dissolved. The resulting solution was filtered, and with washings had a volume of 460 ml. An 80 ml. portion was added to a solution of 7.9 g. of mercuric chloride in 200 ml. water. The resulting precipitate was filtered off, washed 5 times with water, and dried at room temperature.

An acetone solution of this mercuric 9-anthroate was prepared in a dry box containing dry nitrogen, filtered, and spread, in the dry box, on a magnesium photoengraving grade metal plate (2″ x 4″ x 0.064″) by means of a screw-threaded steel rod. When the acetone had evaporated from the plate, the dry box was opened. The plate was coated with a predominantly vitreous layer about 2 to 3 microns thick, which showed slight devitrification. It was stored in the dark overnight, and then used for electrophotography by the method of Example I except that the time of exposure to light was 24 sec. The image reproduced was of acceptable quality.

EXAMPLE X

Anthraquinone-1-carboxylic acid was prepared from benzanthrone by the method of E. de B. Barnett, J. W. Cook, and H. H. Grainger, Ber. 57, 1775 (1924), and reduced to 1-anthroic acid by the method of C. Graebe and S. Blumenfeld, Ber. 30, 1115 (1897). A small excess of the 1-anthroic acid thus prepared was added to a solution of 0.9170 g. of potassium hydroxide in 200 ml. water. The resulting solution was filtered into 2.22 g. of a 51% solution of zinc chloride in water. The two solutions were mixed well to obtain a precipitate of zinc 1-anthroate, which was filtered off, washed 5 times with water, and dried at room temperature. The precipitate product was next dissolved in acetone, whereupon, the solution was filtered and spread on a magnesium metal plate in a dry box containing dry nitrogen by means of a screw-threaded steel rod. After the acetone had evaporated, the dry box was opened. The vitreous layer on the plate was about 3 microns thick. The plate was stored in the dark overnight, then electrophotographically processed by the method of Example I, by charging the plate with a negative corona at 7000 volts, exposing to 12 foot-candles from a tungsten lamp for 12 sec., and developing with Electricon (trademark) formula 60 positive toner (commercially available), the reproduced image was acceptable for use.

EXAMPLE XI

A solution of 0.0604 g. of Lucite (tradename) and 0.0613 g. of zinc 9-anthroate (prepared as described in Example I) in 7.4 ml. of acetone was centrifuged to remove a slight insoluble residue, and used to make a vitreous layer about 3 microns thick on a magnesium metal plate by the method described in Example II. An electrophotographic image was produced by the method described hereinbefore. This image so-reproduced was, like the others, acceptable for use.

EXAMPLE XII

The procedure of Example XI was repeated with a solution of 0.1146 g. of styrene-maleic anhydride copolymer (9.90% maleic anhydride) and 0.1012 g. of zinc 9-anthroate in 2.4 ml. of acetone, except that the time of exposure to light was 60 sec. An acceptable reproduced image was obtained.

EXAMPLE XIII

The procedure of Example X was repeated with a solution of 0.1218 g. of 60% SR-82 silicone resin as a binder in xylene and 0.1147 g. of zinc 9-anthroate in 2.6 ml. of acetone, except that the time of exposure to light was 24 sec. The reproduced image obtained was of good quality.

EXAMPLE XIV 5.0 g. of potassium hydroxide was dissolved in 400 ml. of a liquid mixture consisting of 1 part water and 2 parts ethyl alcohol. 2-anthroic acid was added to the solution until a little remained undissolved. The resulting solution was filtered into 12.1 g. of a 51% solution of zinc chloride in water. The mixture was stirred well, and the resulting precipitate of zinc 2-anthroate was filtered off, washed 5 times with a mixture of 1 part water and 1 part alcohol, and dried at room temperature.

A portion of this product was kept at a temperature within the range of from about 194° to 209° C. for an hour, and 4.67 g. of the material so baked was ball-milled for 16½ hrs. with 200 ml. of Pent-Oxol (tradename) and 0.1 g. of 60% SR-82 silicone resin as a binder in xylene. Thereafter, about 6.88 g. of the same binder was added, and the mixture ball-milled for 3–4 hrs. more. The paste produced by this milling was spread with a glass rod on the uncoated side of paper coated on the reverse side with polyvinylbenzyltrimethylammonium chloride, single layers of Scotch tape being used as spacers. After being dried in a steam oven for 2 hrs. the paper was kept in the dark overnight.

An electrostatic image was produced on the coated paper by the method described in Example I, except that exposure lasted 120 sec. The image reproduced in this manner was acceptable for use.

EXAMPLE XV

A negative image of a transparency image was obtained and used by repeating the procedure of Example XIV with a negative corona and the same toner. This reverse image was of equal quality to those produced above as positive images.

EXAMPLE XVI

To further illustrate that the various anthroate salts and anthroic acid materials in accordance with the present invention are useful as photoconductors, the current flow of each material both in the dark (i.e., the dark current), designated as $I_{dk}$, and when exposed to light (light current), designated as $I_{lt}$, was determined. To accomplish these tests a test cell was prepared comprising pressing a layer of the anthroate material to be tested about 0.3 mm. thick and about 2 square centimeters in area between 2 pieces of tin oxide coated conductive glass. The cell was adapted to be mounted in a dark box through which dry nitrogen gas could flow and into which a beam of light intensity of about $10^4$ foot-candles could be admitted onto the layer of the cell. As mounted in the box one glass plate of the cell was connected to a power supply of 10 volts, D.C. The other glass plate was connected to a sensitive electrometer (serving in this case as an ammeter) also having a common ground wire with the power supply. The cell so mounted was charged in the dark, measured for $I_{dk}$, then exposed to said beam of light for about 1 minute, and again measured, but for $I_{lt}$. These measurements were taken and recorded in Table I below. In addition, the effect of baking the cell was determined by heating same to the temperatures indicated below, cooling to room temperature and then taking both measurements again.

The following table presents the measurements obtained of the materials listed in column 1. The $I_{dk}$ and $I_{lt}$ measurements of the unheated cell are given in columns 2 and 3 while the same measurements for the baked cell are presented in columns 6 and 7 for the temperatures indicated in column 5. Columns 4 and 8 show the ratio of the measurements $I_{lt}$ to $I_{dk}$ for both baked and unbaked test cell. Since about half the sample was obscured by the clamp holding the cell, the ratios are expressed as $$2\frac{I_{lt}}{I_{dk}}$$

since only about half the cell areas reflected the $I_{lt}$ measurement.

TABLE

| Material tested | In the unbaked cell | | | In the baked cell | | | |
|---|---|---|---|---|---|---|---|
| | $I_{dk}$, amp | $I_{lt}$, amp | $2I_{lt}/I_{dk}$ | °C. | $I_{dk}$, amp | $I_{lt}$, amp | $2I_{lt}/I_{dk}$ |
| 1-anthroic acid | $2.7 \times 10^{-14}$ | $1.72 \times 10^{-13}$ | 13 | | | | |
| 2-anthroic acid | $9.95 \times 10^{-13}$ | $5.82 \times 10^{-11}$ | 130 | 153 | $1.6 \times 10^{-14}$ | $2.18 \times 10^{-11}$ | 2,700 |
| Zn 2-anthroate | $3.4 \times 10^{-14}$ | $5.45 \times 10^{-11}$ | 320 | 209 | $3.4 \times 10^{-14}$ | $8.70 \times 10^{-11}$ | 5,100 |
| Cd 2-anthroate | $3.8 \times 10^{-14}$ | $3.34 \times 10^{-11}$ | 1,800 | 148 | $1 \times 10^{-15}$ | $8.9 \times 10^{-12}$ | 1,800 |
| Hg 2-anthroate | $3 \times 10^{-15}$ | $1.40 \times 10^{-12}$ | 930 | 172 | $4 \times 10^{-15}$ | $2.70 \times 10^{-12}$ | 1,400 |
| 9-anthroic acid | $6.0 \times 10^{-14}$ | $1.30 \times 10^{-11}$ | 430 | 177 | $5 \times 10^{-15}$ | $1.90 \times 10^{-11}$ | 7,600 |
| Zn 9-anthroate | $2.5 \times 10^{-14}$ | $4.60 \times 10^{-12}$ | 370 | 153 | $3.5 \times 10^{-14}$ | $2.13 \times 10^{-11}$ | 1,200 |
| Cd 9-anthroate | $2.2 \times 10^{-14}$ | $1.85 \times 10^{-13}$ | 17 | 156 | $2.3 \times 10^{-14}$ | $2.07 \times 10^{-12}$ | 180 |
| Hg 9-anthroate | $2.4 \times 10^{-14}$ | $9.50 \times 10^{-12}$ | 790 | 151 | $3 \times 10^{-15}$ | $1.80 \times 10^{-11}$ | 12,000 |
| Sn(II) 9-anthroate | $4.7 \times 10^{-14}$ | $8.60 \times 10^{-12}$ | 370 | 153 | $6.0 \times 10^{-14}$ | $2.85 \times 10^{-10}$ | 9,500 |
| Pb 9-anthroate | $2 \times 10^{-15}$ | $4.0 \times 10^{-14}$ | 40 | 163 | $1.2 \times 10^{-14}$ | $3.05 \times 10^{-12}$ | 510 |
| Cr 9-anthroate | $1.28 \times 10^{-13}$ | $1.10 \times 10^{-11}$ | 170 | 154 | $2.5 \times 10^{-14}$ | $9.00 \times 10^{-12}$ | 720 |
| Ti(III) 9-anthroate | $5.5 \times 10^{-14}$ | $3.65 \times 10^{-12}$ | 130 | 153 | $2.0 \times 10^{-14}$ | $7.90 \times 10^{-12}$ | 790 |

It can readily be seen that all the materials tested exhibited photoconductive properties, which are suitable for use as photoconductors in electrophotographic printing processes.

I claim:

1. An electrophotographic recording element comprising a substrate carrying on at least one surface thereof an electrophotosensitive layer, said layer containing a photoconductive member of (a) a photoconductive anthroic acid, or (b) a metal anthroate salt of zinc, cadmium, mercury, lead, chromium, titanium or tin, said metal anthroate salt corresponding to the formula:

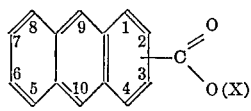

wherein, when X is cadmium or mercury, the carboxylate group

is in the 2 or the 9 position, and when X is lead, chromium, titanium or tin the carboxylate group

is in the 9 position, and when X is zinc the carboxylate group

is in the 1, 2 or 9 position.

2. In a method of electrophotographically reproducing an image wherein, a photosensitive composition as a layer comprising a photoconductor is applied to a substrate element, said layer being then electrostatically charged, exposed to an illuminated image to be reproduced, then contacted with an image developing material and heated, the improvement comprising applying to the substrate element as the photosensitve composition a layer containing a photoconductive member selected from the group consisting of a photoconductive metal anthroate salt or a photoconductive anthroic acid.

3. The improvement of claim 2, wherein the substrate is a conductive glass and the photoconductor as a layer therein is a vitreous photoconductive member selected from the group consisting of zinc 9-anthroate, zinc 1-anthroate, and mercury 9-anthroate.

4. The improvement of claim 2, wherein the photosensitive composition applied as a layer comprises the photoconductive member dispersed in a cross-linking resin and the image developing material is a cross-linking promoting catalyst.

5. The improvement of claim 2, wherein the photoconductive anthroate salt is a member corresponding to the formula:

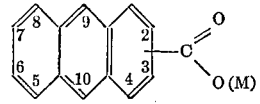

wherein M is a metal selected from the group consisting of zinc, cadmium, mercury, titanium, chromium, lead and tin, said metal anthroate salts being further characterized in that when M is cadmium or mercury the carboxylate group

is in the 2 or 9 position, and that when M is lead chromium, titanium, or tin the carboxylate group

is in the 9 position, and that when M is zinc the carboxylate group

is in the 1, 2 or 9 position.

6. A crystalline metal anthroate salt corresponding to the formula:

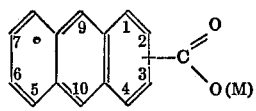

wherein M is a metal selected from the group consisting of zinc, cadmium, mercury, titanium, chromium, lead and tin, said metal anthroate salt being further characterized in that when M is cadmium or mercury the carboxylate group

is in the 2 or 9 position, and that when M is lead, chromium, titanium, or tin the carboxylate group

is in the 9 position, and that when M is zinc the carboxylate group

is in the 1, 2 or 9 position.

7. Vitreous zinc 9-anthroate.
8. Vitreous zinc 1-anthroate.
9. Vitreous mercury 9-anthroate.

References Cited
UNITED STATES PATENTS 3,000,735  9/1961  Gunning et al. _____ 96—1
3,244,516  4/1966  Neugebauer et al. _____ 96—1

NORMAN G. TORCHIN, *Primary Examiner.*
JOHN C. COOPER III, *Assistant Examiner.*

U.S. Cl. X.R.
96—1.5; 260—429, 429.5, 429.7, 433, 435, 438.5, 515